(12) United States Patent
ElGamal et al.

(10) Patent No.: US 7,944,985 B2
(45) Date of Patent: May 17, 2011

(54) MIMO TRANSMITTER AND RECEIVER FOR SUPPORTING DOWNLINK COMMUNICATION OF SINGLE CHANNEL CODEWORDS

(75) Inventors: Hesham ElGamal, Dublin, OH (US); Aykut Bultan, Bayside, NY (US); Chang-Soo Koo, Melville, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 813 days.

(21) Appl. No.: 11/842,252

(22) Filed: Aug. 21, 2007

(65) Prior Publication Data

US 2008/0144733 A1 Jun. 19, 2008

Related U.S. Application Data

(60) Provisional application No. 60/823,484, filed on Aug. 24, 2006.

(51) Int. Cl.
*H04B 7/02* (2006.01)
(52) U.S. Cl. ...................................... 375/267
(58) Field of Classification Search .................. 375/260, 375/261, 267, 299
See application file for complete search history.

(56) References Cited

U.S. PATENT DOCUMENTS

| | | | |
|---|---|---|---|
| 2006/0018397 A1 | 1/2006 | Sampath et al. | |
| 2007/0041461 A1* | 2/2007 | Lu et al. | 375/261 |
| 2009/0285332 A1* | 11/2009 | Damen et al. | 375/299 |

FOREIGN PATENT DOCUMENTS

| | | |
|---|---|---|
| EP | 1255369 | 11/2002 |
| EP | 1594245 | 11/2005 |
| RU | 2238611 | 10/2004 |
| RU | 2003135853 | 4/2005 |

OTHER PUBLICATIONS

Alamouti, "A Simple Transmit Diversity Technique for Wireless Communications", IEEE Journal on Select Areas in Communications, vol. 16, No. 8, pp. 1451-1458, (Oct. 1998).
Foschini, "Layered Space-Time Architecture for Wireless Communication in a Fading Environment When Using Multi-Element Antennas", Bell Labs Technical Journal, Autumn, (1996).

(Continued)

*Primary Examiner* — Don N Vo
(74) *Attorney, Agent, or Firm* — Woodcock Washburn LLP (57) ABSTRACT

The downlink (DL) communication of single channel codewords is supported by providing a multiple-input multiple-output (MIMO) transmitter and receiver. The transmitter includes $N_T$ transmit antennas for transmitting spatial streams to a receiver having $N_R$ receive antennas, a precoder and a space-time or space-frequency matrix construction unit in communication with the precoder and the transmit antennas. The space-time or space-frequency matrix construction unit constructs a matrix that defines a threaded algebraic space-time (TAST) codeword based on a number of virtual antennas, $N_V$, and the number of transmit antennas, $N_T$. The transmitter operates in an open loop mode when no feedback information from the receiver is available, a semi-open loop mode when channel rank information is available, and a closed loop mode when channel state information (CSI) is available. The receiver is configured to provide feedback to the transmitter on a per received spatial stream basis

24 Claims, 3 Drawing Sheets

OTHER PUBLICATIONS

France Telecom, Orange, "Open Loop Transmit Diversity Scheme for Full Rate and Flexible Antenna Configurations", 3GPP TSG RAN WG1 LTE Ad Hoc Meeting, R1-060552, (Denver, Feb. 13-17, 2006).

Gamal et al., "The MIMO ARQ Channel: Diversity-Multiplexing-Delay Tradeoff", IEEE Transactions on Information Theory, vol. 52, No. 8, pp. 3601-3621, (Published Aug. 2006, Submitted on Nov. 1, 2004).

Gamal et al., "Universal Space-Time Coding", IEEE Transactions on Information Theory, vol. 49, No. 5, pp. 1097-1119, (May 2003).

Love et al., "Limited Feedback Unitary Precoding for Spatial Multiplexing Systems", IEEE Transactions on Information Theory, vol. 51, No. 8, pp. 2967-2976, (Aug. 2005).

Bosisio et al., "Fair Scheduling and Orthogonal Linear Precoding/Decoding in Broadcast MIMO Systems," IEEE 16th International Sysmposium on Personal, Indoor, and Mobile Radio Communications, vol. 2, pp. 832-836 (Sep. 2005).

South Korean Application No. 10-2009-7005922: Office Action, dated Oct. 20, 2010, 4 pages.

* cited by examiner

MIMO TRANSMITTER AND RECEIVER FOR SUPPORTING DOWNLINK COMMUNICATION OF SINGLE CHANNEL CODEWORDS

CROSS REFERENCE TO RELATED APPLICATION

This application claims the benefit of U.S. Provisional Application No. 60/823,484 filed Aug. 24, 2006, which is incorporated by reference as if fully set forth.

FIELD OF INVENTION

The present invention is related to a wireless communication system including a multiple-input multiple-output (MIMO) transmitter and a receiver. More particularly, supporting the downlink (DL) communication of single channel codewords is disclosed.

BACKGROUND

Threaded algebraic space-time (TAST) precoder architecture consists of three main parts: a precoder, TAST and a beamformer. The precoder provides constellation rotation. TAST is a full diversity full rate (FDFR) diagonal space-time coding scheme. There also exists a reduced rate version of TAST. Beamforming is only for closed loop and for $N_T > N_R$, where $N_T$ is the number of transmitter (Tx) antennas and $N_R$ is the number of receiver (Rx) antennas. The beamformer uses singular value decomposition (SVD) and assumes the whole channel state information (CSI), (quantized), is available in the transmitter.

There are four transmission modes of operation in the TAST precoder architecture: an open loop (OL) mode, an open loop with channel rank feedback, (i.e., rank adaptation), (OL-R) mode, a closed loop (CL) mode and a closed loop with channel rank feedback (CL-R) mode.

A TAST precoder can be applied in either space-time or space-frequency. A value for the parameter M must be determined, where M is equal to the average number of resolvable independent Rayleigh fading multipaths. For a flat fading channel, M=1. M should be chosen such that K is an integer multiple of M, where K is the total number of subcarriers. However, M also has a big impact on the complexity of the receiver. Therefore, for an extremely frequency selective channel, M can be limited to a predetermined maximum value if necessary.

The entire frequency band is divided into M sub-bands. Inside each sub-band, the assumption of flat fading is assumed. In each subband, there are K/M subcarriers. A subband is a frequency band where the assumption of flat fading is assumed.

Next, one of the four transmission modes defined earlier should be selected based on the feedback information available and whether $N_T > N_R$ is true or not, as depicted below:

1) OL transmission mode:

$$L=\min(N_T,N_R), N_V=N_T; \quad \text{Equation (1)}$$

2) OL-R transmission mode:

$$L=\text{rank}(H), N_V=N_T; \quad \text{Equation (2)}$$

3) CL transmission mode:

$$N_V=L=\min(N_T,N_R); \text{ and} \quad \text{Equation (3)}$$

4) CL-R transmission mode:

$$N_V=L=\text{rank}(H); \quad \text{Equation (4)}$$

where H is the MIMO channel matrix of size $N_R \times N_T$, L is the total number of threads, and each thread uses $N_V$ consecutive frequencies from each subband, where $N_V$ is the number of virtual Tx antennas. The size, (i.e., the number of rows and columns), of the space-frequency matrix, S, is $N_V \times S_F$, where $S_F = N_V \times M$. The total number of elements in S constitutes one TAST codeword. The total number of TAST codewords per orthogonal frequency division multiplexing (OFDM) symbol is equal to $K/S_F$, where $S_F$ is a spreading factor (SF) of size $N_V \times M$. An SF can be over space, time or frequency dimensions, or over joint-time or joint-space-frequency planes.

For each TAST codeword, a group of $L \times S_F$ quadrature amplitude modulation (QAM) symbols is divided into L threads (i.e., groups) where each group has $S_F$ elements.

Input QAM symbols for one TAST codeword are shown below:

$$u_1=(u_{11},u_{12},\ldots u_{1S_F}),$$

$$u_L=(u_{L1},u_{L2},\ldots u_{LS_F}) \quad \text{Equation (5)}$$

where u represents a complex Tx symbols vector before precoding of size $S_F \times 1$.

The precoder matrix is a Vandermonde (VMD) matrix of size $S_F \times S_F$, where:

$$C=VMD(\theta_1,\ldots,\theta_{S_F}) \quad \text{Equation (6)}$$

where C is a Vandermonde constellation rotation matrix of size $S_F \times S_F$, and $\theta_1,\ldots,\theta_{S_F}$ are the roots of the polynomial $X^{S_F} - i$ for $S_F = 2^p$, $p \geq 1$, $i = \sqrt{-1}$.

Examples of Precoder Matrix

For $S_F = 2$ $$C = \frac{1}{\sqrt{2}}\begin{pmatrix} 1 & e^{i\pi/4} \\ 1 & -e^{i\pi/4} \end{pmatrix}. \quad \text{Equation (7)}$$

For $S_F = 3$, $$C = \frac{1}{\sqrt{3}}\begin{pmatrix} 1 & -e^{i\pi/9} & e^{i4\pi/9} \\ 1 & -je^{i2\pi/9} & -(1+j)e^{i4\pi/9} \\ 1 & -je^{i2\pi/9} & -(1+j^2)e^{i4\pi/9} \end{pmatrix}; \quad \text{Equation (8)}$$

where $j = \dfrac{i\sqrt{3}-1}{2}$.

The precoder output is obtained as follows:

$$b_1=Cu_1$$

$$b_L=Cu_L \quad \text{Equation (9)}$$

where $b_j$ constitutes a spatial layer. When each of these layers is placed in the space-frequency matrix in a special way, then they constitute a thread. Thus, a thread is a layer with a full spatial and temporal span such that each symbol goes through different virtual antennas (or real antennas) at different time-frequency responses. Complex symbols to be transmitted are placed in either a space-time or space-frequency matrix such that it shows which symbols are transmitted at which antenna (virtual or real) and at which time-frequency resource. This is easily achieved by diagonal layering in the space-frequency matrix.

Thread Construction

Assume that the subband indices span [1,M], antenna indices span [1, $N_V$], and the threads are numbered as $1 \leq j \leq L$, then the indexing set (row, column number) for the thread j can be written as:

$$l_j=\{(\lfloor k+j-1 \rfloor_{N_V}+1,k+1):0 \leq k < S_F\} \text{ for } 1 \leq j \leq L \quad \text{Equation (10)}$$

where $\lfloor . \rfloor_N$ denotes the mod-N operation.

Space-Frequency Matrix Examples $N_V = 2, L = 2, M = 1$ $$\begin{pmatrix} 1 & 2 \\ 2 & 1 \end{pmatrix}$$

$N_V = 4, L = 4, M = 1$ $$\begin{pmatrix} 1 & 4 & 3 & 2 \\ 2 & 1 & 4 & 3 \\ 3 & 2 & 1 & 4 \\ 4 & 3 & 2 & 1 \end{pmatrix}$$

$N_V = 2, L = 2, M = 2$ $$\begin{array}{c} \text{Antenna 1} \\ \text{Antenna 2} \end{array} \left\{ \begin{pmatrix} 1 & 2 \\ 2 & 1 \end{pmatrix} \middle| \begin{pmatrix} 1 & 2 \\ 2 & 1 \end{pmatrix} \right\}$$
$$\underbrace{\phantom{xxxx}}_{\substack{f_1\ f_2 \\ \text{Subband 1}}} \underbrace{\phantom{xxxx}}_{\substack{f_3\ f_4 \\ \text{Subband 2}}}$$

Diophantine Numbers

In TAST construction, there is no self interference from one thread which is a rate one code. However, as the number of threads increase, the mutual interference between threads increase. To suppress this interference, each thread is assigned a number which is selected to minimize the interference. This number is referred to as a Diophantine number. Each thread is assigned a Diophantine number such that $$v_1 = \phi_1 b_1 = \phi_1 C u_1$$

$$v_L = \phi_L b_L = \phi_L C u_L \quad \text{Equation (11)}$$

where v represents a complex Tx symbols vector after precoding (layer) of size $S_F \times 1$.

It is proven that the following number set minimizes the mutual interference between the threads.

$$\{\phi_1 = 1, \phi_2 = \phi^{1/S_F}, \ldots, \phi_L = \phi^{(L-1)/S_F}\};$$

where $\phi$ can be chosen as $\phi = e^{j\lambda}, \lambda \neq 0$.

Final Space-Frequency Matrix Examples

Example 1

When $N_V = 2, L = 2, M = 1$ and $b_1 = (b_{11}, b_{12})^T, b_2 = (b_{21}, b_{22})^T,$ $$S = \begin{pmatrix} \phi_1 b_{11} & \phi_2 b_{22} \\ \phi_2 b_{21} & \phi_1 b_{12} \end{pmatrix}; \quad \text{Equation (12)}$$

where $\phi_1 = 1, \phi_2 = \phi^{1/2}, \phi = e^{i\pi/6}$.

Example 2

When $N_V = 3, L = 2, M = 1$ and $b_1 = (b_{11}, b_{12}, b_{13})^T, b_2 = (b_{21}, b_{22}, b_{23})^T,$ $$S = \begin{pmatrix} b_{11} & 0 & \phi^{1/3} b_{23} \\ \phi^{1/3} b_{21} & b_{12} & 0 \\ 0 & \phi^{1/3} b_{22} & b_{13} \end{pmatrix}; \quad \text{Equation (13)}$$

where $\phi_1 = 1, \phi_2 = \phi^{1/3}, \phi = e^{i\pi/6}$.

Example 3

$N_V = 3, L = 3, M = 1$ and $b_1 = (b_{11}, b_{12}, b_{13})^T,$ $b_2 = (b_{21}, b_{22}, b_{23})^T,$ $b_3 = (b_{31}, b_{32}, b_{33})^T,$ $$S = \begin{pmatrix} v_{11} & v_{32} & v_{23} \\ v_{21} & v_{12} & v_{33} \\ v_{31} & v_{22} & v_{13} \end{pmatrix}$$

$$= \begin{pmatrix} b_{11} & \phi^{2/3} b_{32} & \phi^{1/3} b_{23} \\ \phi^{1/3} b_{21} & b_{12} & \phi^{2/3} b_{33} \\ \phi^{2/3} b_{31} & \phi^{1/3} b_{22} & b_{13} \end{pmatrix}; \quad \text{Equation (14)}$$

where $\phi_1 = 1, \phi_2 = \phi^{1/3}, \phi_3 = \phi^{2/3}, \phi = e^{i\pi/12}$.

Transmitted Signal

Using the previous example for transitioning to the receiver formulation:

$$S = \begin{pmatrix} v_{11} & v_{32} & v_{23} \\ v_{21} & v_{12} & v_{33} \\ \frac{v_{31}}{x_1} & \frac{v_{22}}{x_2} & \frac{v_{13}}{x_3} \end{pmatrix}$$

$$= \begin{pmatrix} b_{11} & \phi^{2/3} b_{32} & \phi^{1/3} b_{23} \\ \phi^{1/3} b_{21} & b_{12} & \phi^{2/3} b_{33} \\ \phi^{2/3} b_{31} & \phi^{1/3} b_{22} & b_{13} \end{pmatrix} \quad \text{Equation (15)}$$

$$= (x_1 x_2 x_3).$$

Any transmitted vector, x, at any frequency in an OFDM symbol consists of L non-zero elements, $x_j = v_{lj}$ where $1 \leq l \leq L$, and $N_V - L$, and a total of $N_V$ elements. Each space-frequency matrix consists of $S_F = N_V M$ transmitted vectors.

Joint Minimum Mean-Square Error (MMSE) Receiver For each transmitted vector at each frequency, the received signal can be written as:

$$y = Hx + n \quad \text{Equation (16)}$$

where y and n are $N_R \times 1$, x represents complex TX symbols transmitted of size $N_T \times 1$ and H is a MIMO channel matrix of size $N_R \times N_T$. Since the original symbols are spread over space-frequency, the received symbols are decoded jointly in space and frequency. Otherwise, performance degradation may occur. Thus, the entire space-frequency matrix must be obtained in the receiver before decoding.

After all the symbols for the space-frequency matrix, S, are obtained, the receive vectors that belong to the same space-frequency matrix are augmented on top of each other. Since S contains $S_F$ transmitted vectors, the augmented receive and transmit vectors are constructed by merging $S_F$ vectors as follows:

$$u_a = \begin{pmatrix} u_1 \\ \vdots \\ u_{S_F} \end{pmatrix}, \text{ and} \quad \text{Equation (17)}$$

-continued $$y_a = \begin{pmatrix} y_1 \\ \cdots \\ y_{S_F} \end{pmatrix},$$  Equation (18)

then the augmented receive vector can be written as:

$$y_\alpha = H_\alpha u_\alpha + n_\alpha;$$  Equation (19)

where augmented channel matrix $H\alpha$ is derived from MIMO equations for the received signal.

If a joint MMSE receiver is used, the estimated symbol vector can be written as:

$$\tilde{u}_a = \left(H_a^H H_a + \frac{1}{\rho}I\right)^{-1} H_a^H y_a;$$  Equation (20)

where $u_\alpha$ is the estimated vector and the covariance matrices are assumed to be diagonal as follows:

$$R_{n\alpha} = \sigma_{n_\alpha}^2 I,$$  Equation (21)

$$R_{u\alpha} = \sigma_{u_\alpha}^2 I, \text{ and}$$  Equation (22)

$$\rho = \frac{\sigma_{u_a}^2}{\sigma_{n_a}^2}.$$  Equation (23)

EXAMPLES

Example 1:

$N_V=2, L=2, M=1$ and $b_1=(b_{11},b_{12})^T, b_2=(b_{21},b_{22})^T.$ $$C = \frac{1}{\sqrt{2}} \begin{pmatrix} 1 & e^{i\pi/4} \\ 1 & -e^{i\pi/4} \end{pmatrix},$$  Equation (24)

$$u_a = \begin{pmatrix} u_1 \\ u_2 \end{pmatrix}, \text{ and}$$  Equation (25)

$$S = \begin{pmatrix} \phi_1 b_{11} & \phi_2 b_{22} \\ \phi_2 b_{21} & \phi_1 b_{12} \end{pmatrix};$$  Equation (26)

where $\phi_1=1, \phi_2=\phi^{1/2}, \phi=e^{i\pi/6}$.

The final transmitted space-frequency matrix can then be written as:

$$S = \begin{pmatrix} au_{11} + bu_{12} & gu_{21} + mu_{22} \\ eu_{21} + fu_{22} & cu_{11} + du_{12} \end{pmatrix};$$  Equation (27)

where $\alpha=1, b=e^{i\pi/4}, c=1, d=-e^{i\pi/4}, e=e^{i\pi/12}, f=e^{i\pi/3}, g=e^{i\pi/12}, m=-e^{i\pi/3}$.

The augmented channel matrix can be written as:

$$H_a = \begin{pmatrix} ah_{11}(k_1) & bh_{11}(k_1) & eh_{12}(k_1) & fh_{12}(k_1) \\ ah_{21}(k_1) & bh_{21}(k_1) & eh_{22}(k_1) & fh_{22}(k_1) \\ ch_{12}(k_2) & dh_{12}(k_2) & gh_{11}(k_2) & mh_{11}(k_2) \\ ch_{22}(k_2) & dh_{22}(k_2) & gh_{21}(k_2) & mh_{21}(k_2) \end{pmatrix}.$$  Equation (28)

Note that the size of the augmented channel matrix is $(N_V S_F) \times (LS_F)$.

Therefore, for L=1, the augmented channel matrix becomes:

$$H_a = \begin{pmatrix} ah_{11}(k_1) & bh_{11}(k_1) \\ ah_{21}(k_1) & bh_{21}(k_1) \\ ch_{12}(k_2) & dh_{12}(k_2) \\ ch_{22}(k_2) & dh_{22}(k_2) \end{pmatrix}.$$  Equation (29)

The generalized precoder can be written as a multiplication of four matrices:

$$B_n(k) = \sqrt{\frac{N_T}{N_V}} T_n(k) V_n(k) P_n(k) C_n(k);$$  Equation (30)

where k represents a subcarrier index, n represents an OFDM symbol index, $N_T$ is the number of $T_x$ antennas and $N_V$ is the number of virtual antennas. A time-frequency resource is one subcarrier of one OFDM symbol.

When a precoding matrix is used alone, it can provide spatial spreading or constellation rotation to provide extra diversity. Precoding alone can also be used to group users in terms of their preferred preceding matrices. This scheme might also be combined with scheduling.

When precoding is combined with space-time-frequency block code (STFBC), it can provide extra diversity gains in time or frequency (e.g., diagonal threaded space-time (DTST), TAST, and the like). For example, TAST uses a Vandermonde matrix for constellation rotation, followed by a diagonal STFBC. DTST uses a Hadamard matrix followed by a diagonal STFBC.

In general, beamforming or antenna selection is combined with preceding (e.g., TAST) only when $N_T > N_R$ with a gain of 10 log($N_T$/Nv) dB. SVD is one of the popular beamforming techniques that can be used in a closed loop operation, (e.g., TAST).

Power loading per antenna per subcarrier can be used to implement water-filling concept as a stand alone technique or as complimentary to AMC techniques. Power loading is a diagonal matrix $P_n(k)$ which is defined as follows:

$$P_n(k) = \text{diag}(\sqrt{p_1}, \sqrt{p_2}, \ldots \sqrt{p_{N_v}})$$  Equation (31)

The last piece of the generalized precoder is cyclic delay diversity (CDD). CDD provides gains when used with flat fading channel. It is not so useful for frequency selective channel. CDD is a diagonal matrix $T_n(k)$ which is defined as follows:

$$T_n(k) = \text{diag}(1, e^{-i2\pi k \Delta f \Delta t}, e^{-i4\pi k \Delta f \Delta t}, \ldots, e^{-i2\pi k (N_T-1) \Delta f \Delta t})$$  Equation (32)

Figure 1:
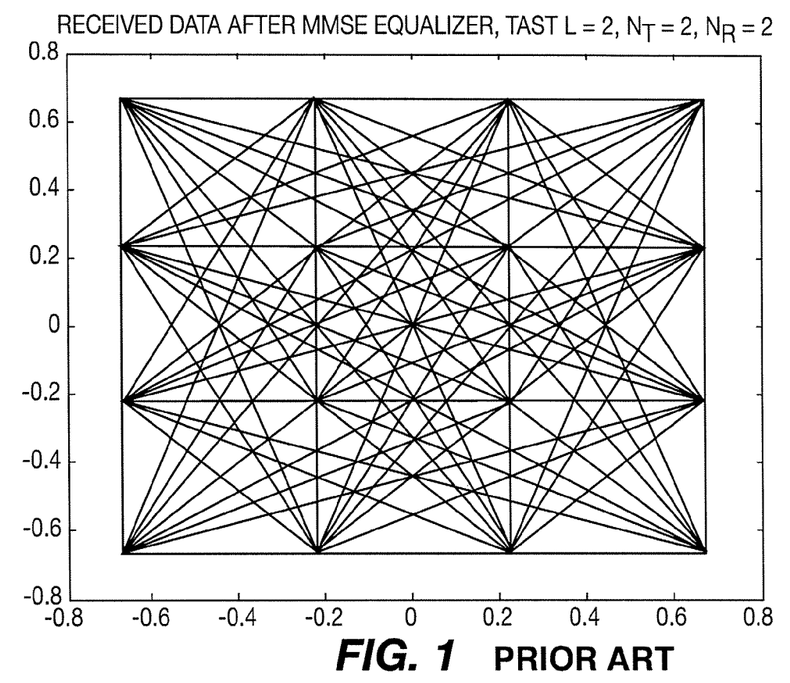
FIG. 1 is a constellation diagram of received data after a conventional MMSE equalizer for 16 QAM.
Figure 2:
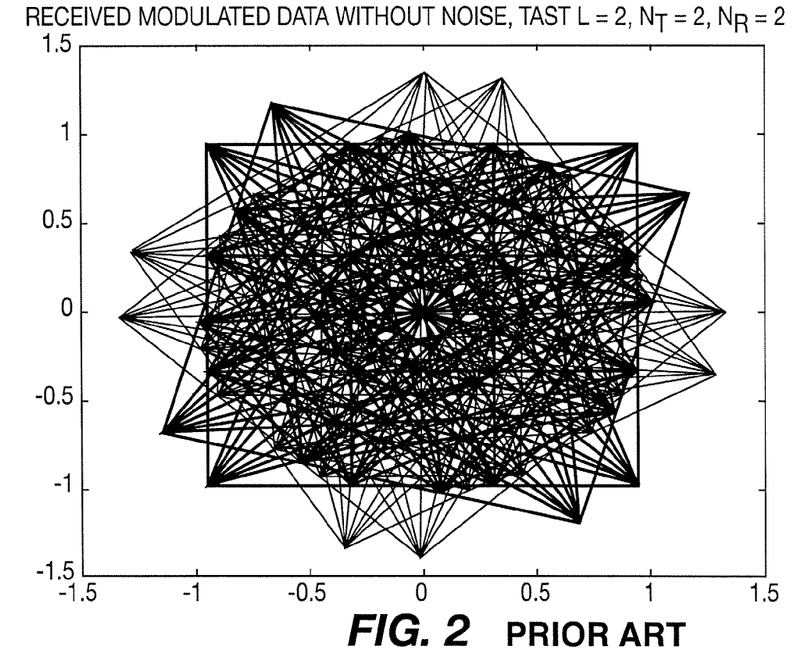
FIG. 2 is a rotated constellation diagram of received modulated data without noise for 16 QAM after TAST coding is applied to the received data of FIG. 1.
Figure 3:
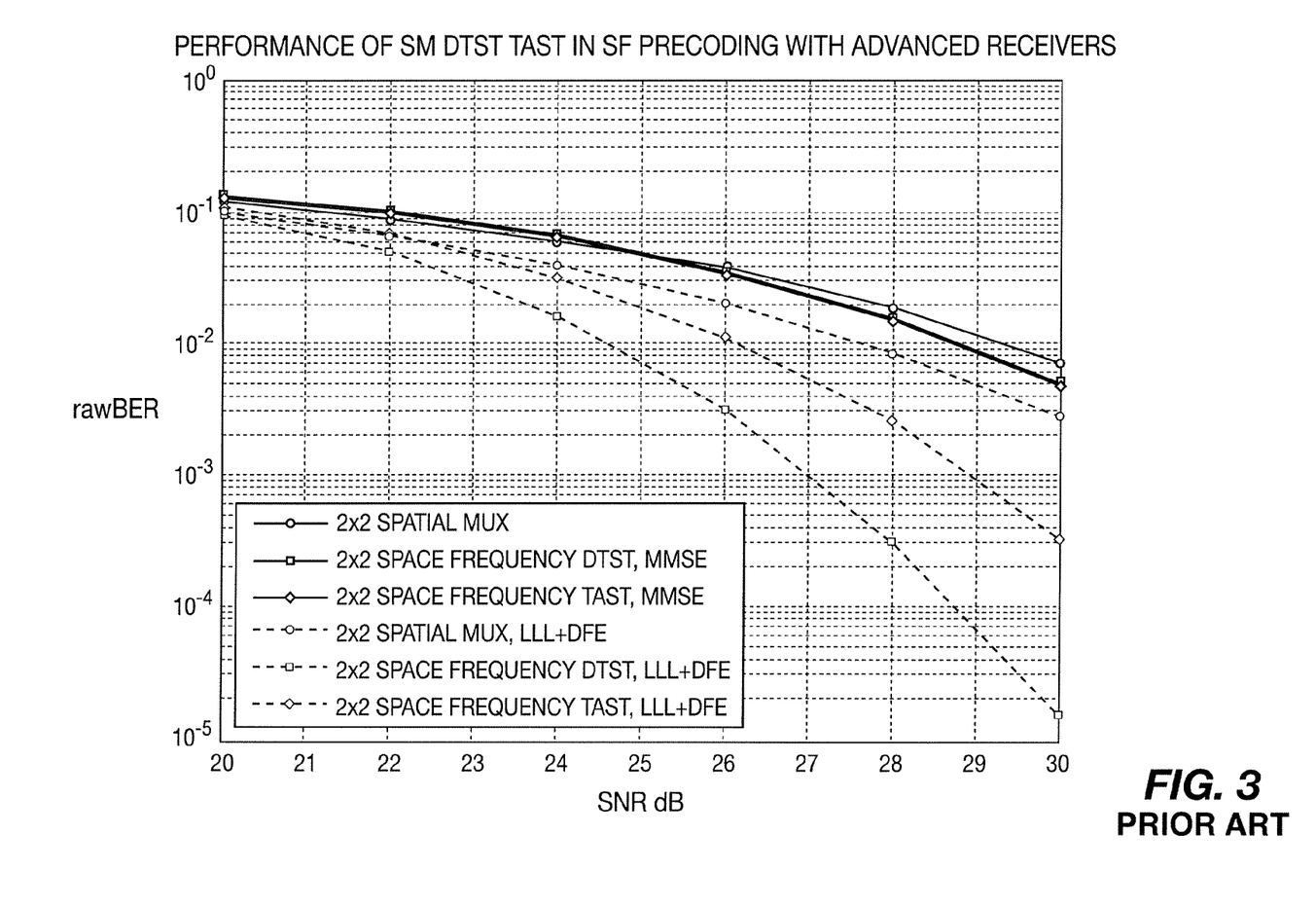
FIG. 3 shows performance of spatial multiplexing STST TAST in SF precoding with conventional advanced receivers.

FIG. 1 is a constellation diagram of received data after a conventional MMSE equalizer for 16 QAM. FIG. 2 is a rotated constellation diagram of received modulated data without noise for 16 QAM after TAST coding is applied to the received data of FIG. 1. Each layer in TAST has a different constellation rotation. This provides extra diversity for each layer and also increases the distance for layers during the decoding process.

There are many different forms of precoders, beamformers and space-time or space-frequency coding schemes that have been proposed. It would be desirable to provide a unified framework for MIMO precoding that could achieve all of the benefits of spatial multiplexing, spatial and frequency diversity, beamforming, adaptive power and rate control, and automatic repeat request (ARQ) diversity.

SUMMARY

The downlink communication of single channel codewords is supported by providing a MIMO transmitter and receiver. The transmitter includes $N_T$ transmit antennas for transmitting spatial streams to a receiver having $N_R$ receive antennas, a precoder and a space-time or space-frequency matrix construction unit in communication with the precoder and the transmit antennas. The space-time or space-frequency matrix construction unit constructs a matrix that defines a TAST codeword based on a number of virtual antennas, $N_V$, and the number of transmit antennas, $N_T$. The transmitter operates in an open loop mode when no feedback information from the receiver is available, a semi-open loop mode when channel rank information is available, and a closed loop mode when CSI is available. The receiver is configured to provide feedback to the transmitter on a per received spatial stream basis.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The DL MIMO architecture presented here encompasses many of the proposed schemes as special cases obtained by simply changing the parameters or the combinations of the modules.

A simulation platform that will support most of the proposed schemes and provide flexible algorithm development environment is disclosed. Jointly optimizing the spatial multiplexing order and diversity gain is achieved by dividing the frequency band into subbands obtained by combining consecutive time frequency resource blocks (RB). Information symbols are then spread over different subbands to increase diversity.

For this purpose, modulated symbols are grouped into space-time or space-frequency (STF) codewords. Each STF codeword consists of Ns L modulated symbols, where Ns is the number of spatial streams. Each codeword is divided into Ns component vectors (spatial layers), $u_j$, j=1, ... Ns, of length L.

Each component vector is precoded such that it can be spread over space or joint space-time or joint space-frequency where $u_j \rightarrow v(u_j)$. The output vectors are then distributed across antennas and time and frequency resources in order to maximize the diversity advantage.

For spatial multiplexing (SM) orders larger than one, spatial interference occurs between the different layers. This spatial interference can be reduced by assigning the constituent code in each spatial layer to a different algebraic subspace where $v_j = \phi_j v(u_j)$.

Modes of Operation

The multiplexing and diversity module can be optimized for the following three modes of operation based on the available feedback information.

Open loop: No feedback information is available. The SM order is selected as Ns=min($N_T$, $N_R$). For this case the number of virtual antennas Nv is selected to be the number of Tx antennas $N_T$.

Semi-open loop: Channel rank information is available in the transmitter. Then, Ns=rank(H). For this case, $N_V = N_T$ is selected.

Closed loop: CSI is available in the transmitter. Then Ns=Nv=rank(H). If Nv < $N_T$, either antenna selection or beamforming can be applied in the transmitter. An additional gain of 10 $\log_{10}(N_T/N_V)$ dB can be achieved.

Examples of MIMO schemes using the unified architecture include Alamouti space-time block code (STBC), diagonal Bell-Labs layered space-time (BLAST), DTST codes and TAST codes (with and without frequency diversity).

Example 1

Alamouti Scheme

Alamouti proposed STBC over two Tx antennas that achieves full diversity while allowing a simple linear processing decoder. Full diversity means that each symbol goes through $N_T N_R M$ independent random variables through the MIMO channel where the Alamouti Scheme is depicted by:

$$S = \begin{pmatrix} u_1 & -u_2^* \\ u_2 & u_1^* \end{pmatrix}; \quad \text{Equation (33)}$$

which can re-written as:

$$S = \begin{pmatrix} u_1 & -iu_2^* \\ iu_2 & u_1^* \end{pmatrix}. \quad \text{Equation (34)}$$

The precoding can be written as:

$$v_1(u_1) = (u_1, u_1^*) \quad \text{Equation (35)}$$

$$v_2(u_2) = (\phi^{1/2} u_2, \phi^{1/2} u_2^*), \text{ where } \phi = -1 \quad \text{Equation (36)}$$

For this scheme, the parameters are:

$$M = 1, N_T = N_V = N_S = 2, L = 1, N = 2;$$

$$R_P = N_S \frac{L}{N} = 1; \text{ and}$$

$$D_P = N_V N_R = 4;$$

where M is the average number of resolvable independent Rayleigh fading multipaths, $R_P$ is the precoder rate, $D_P$ is the maximum diversity order through the usage of either time or frequency dimension (=$N_T N_R M$), Ns is the number of spatial streams, $N_T$ is the number of Tx antennas, N is the number of entries of the Tx symbol vector after preceding, L is the number of threads, $N_R$ is the number of Rx antennas. For TAST,N=$S_F$=$N_V$×M. Note that the Alamouti scheme cannot achieve multiplexing orders larger than one.

Example 2

Diagonal-Blast

The STBC matrix for D-BLAST can be written as;

$$S = \begin{pmatrix} v_{11} & \phi^{1/2}v_{21} & 0 \\ 0 & v_{12} & \phi^{1/2}v_{22} \end{pmatrix}; \quad \text{Equation (37)}$$

where $v_{11}, \ldots v_{22}$ and $\phi$ are constructed by using channel coding diagonally inside each layer. For this scheme, the parameters are:

$$M = 1, N_T = N_V = N_S = N_R = 2, L = 2, N = N_v + N_S - 1 = 3;$$

$$R_P = N_S \frac{L}{N} = \frac{4}{3}; \text{ and}$$

$$D_P = N_V N_R = 4.$$

Note that the rate is less than the maximum rate(min($N_T,N_R$)). Full diversity is already ensured by the component precoders, within each layer, and expansion of the code temporal dimension

Example 3

DTST

DTST codes use diagonal spatial layering in the space-time matrix. $N_V$=3,$N_S$=3,M=1; where $v_1$=$(V_{11},V_{12},V_{13})^T$, $V_2$=$(V_{21},V_{22},V_{23})^T$, $V_3$=$(V_{31},V_{32},V_{33})^T$. The precoding matrix used is a Hadamard matrix of size $N_V \times N_V$.

$$C = \frac{1}{\sqrt{3}}\begin{pmatrix} 1 & 1 & 1 \\ 1 & -1 & 1 \\ 1 & 1 & -1 \end{pmatrix}; \quad \text{Equation (38)}$$

$$v_j = \phi_j Cu_j; \text{ and} \quad \text{Equation (39)}$$

$$S = \quad \text{Equation (40)}$$

$$\frac{1}{\sqrt{3}}$$

$$\begin{pmatrix} u_{11}+u_{12}+u_{13} & u_{21}+u_{22}+u_{23} & u_{31}+u_{32}+u_{33} \\ u_{31}-u_{32}+u_{33} & u_{11}-u_{12}+u_{13} & u_{21}-u_{22}+u_{23} \\ u_{21}+u_{22}-u_{23} & u_{31}+u_{32}-u_{33} & u_{21}+u_{22}-u_{23} \end{pmatrix};$$

where $$\phi_1 = \phi_2 = \phi_3 = 1; M = 1,$$

$$N_T = N_V = 3, N_S = N_R = 3, L = 3, N = 3;$$

$$R_P = N_S \frac{L}{N} = 3; \text{ and } D_P = N_V N_R = 9.$$

Note that this scheme has full rate and it has the potential of achieving full diversity for flat fading channel. However, the problem with this scheme is that it does not provide suppression of interference between the spatial layers. Therefore, in practice this scheme may not achieve full diversity. Also, joint space-frequency and joint space-time diversity is not being used.

Example 4

Full Rate and Full Diversity TAST

Threaded algebraic space-time codes (TAST) use diagonal spatial layering in the space-time matrix similar to DTST. This spatial layering is called threading. $N_V$=3, $N_S$=2, M=1; where $v_1$=$(v_{11},v_{12},v_{13})^T$, $v_2$=$(v_{21}, v_{22}, v_{23})^T$.
The preceding matrix used is a Vandermonde matrix of size $N_V M \times N_V M$; which provides different constellation rotation for each entry in S.

$$C = VMD(\theta_1, \ldots, \theta_{N,M}) \quad \text{Equation (41)}$$

$$= \frac{1}{\sqrt{3}}\begin{pmatrix} 1 & -e^{i2\pi/9} & e^{i4\pi/9} \\ 1 & -je^{i2\pi/9} & -(1+j)e^{i4\pi/9} \\ 1 & -je^{i2\pi/9} & -(1+j^2)e^{i4\pi/9} \end{pmatrix};$$

where $\theta_1, \ldots, \theta_{S_F}$ are the roots of the polynomial $X^{S_F}$–i for $S_F$=$2^p$, p≥1,i=$\sqrt{-1}$.

$$v_j = \phi_j Cu_j; \text{ and} \quad \text{Equation (42)}$$

$$S = \begin{pmatrix} v_{11} & 0 & \phi^{1/3}v_{23} \\ \phi^{1/3}v_{21} & v_{12} & 0 \\ 0 & \phi^{1/3}v_{22} & v_{13} \end{pmatrix}; \quad \text{Equation (43)}$$

where:
$\phi_1$=1,$\phi_2$=$\phi^{1/3}$,$\phi$=$e^{i\pi/6}$ are Diophantine numbers; M=1, $N_T$=$N_V$=3,$N_S$=$N_R$=2,L=3,N=3; Note that full diversity and full rate, 2, is achieved for flat fading channel. Flexibility of this scheme is that the number of spatial streams can be adjusted from 1 to the maximum rate.

Example 5

TAST With Frequency Diversity

Here it is assumed that there are two multipath components within the assigned subcarriers $N_V$=2, $N_S$=2, M=2 (2 multipaths and 2 subbands are assumed) where $v_1=(v_{11},v_{12},v_{13},v_{14})^T$, $v_2=(v_{21}, v_{22},v_{23},v_{24})^T$. The precoding matrix used is a Vandermonde matrix of size $N_V M \times N_V M$.

$$C = \text{VMD}(\theta_1, \ldots, \theta_{N_V M}) \quad \text{Equation (44)}$$

$$V_j = \phi_j C u_j; \text{ and} \quad \text{Equation (45)}$$

$$S = \begin{matrix} \text{Antenna 1} \\ \text{Antenna 2} \end{matrix} \left\{ \underbrace{\begin{pmatrix} v_{11} & \phi^{1/4} v_{22} \\ \phi^{1/4} v_{21} & v_{12} \end{pmatrix}}_{\substack{f_1 f_2 \\ \text{Subband 1}}} \middle| \underbrace{\begin{pmatrix} v_{13} & \phi^{1/4} v_{24} \\ \phi^{1/4} v_{23} & v_{14} \end{pmatrix}}_{\substack{f_3 f_4 \\ \text{Subband 2}}} \right\}; \quad \text{Equation (46)}$$

where $\phi_1 = 1, \phi_2 = \phi^{1/4}, \phi = e^{i\pi/6}$;

$M = 2, N_T = N_V = N_S = N_R = 2, L = 4, N = 4$;

$R_P = N_S \frac{L}{N} = 2$; and $D_P = N_V N_R M = 8$.

Note that full diversity and full rate is achieved for a frequency-selective channel with average number of two multipaths.

The Beamforming Module

If $N_T > N_R$, and some CSI feedback is available from the receiver, either Tx antenna/beam selection or beamforming can be used. Beamforming can be implemented using SVD or other techniques. These schemes can be combined with STFBC.

Incremental Precoding Module (ARQ Diversity)

The final ingredient in our framework is the incremental redundancy module which allows for optimally exploiting the ARQ retransmissions. Subsequent iterations are relied on to clean-up the residual errors with a minimal reduction in the average throughput. In order to achieve this goal, the codewords sent in the ARQ rounds must be properly constructed according to the incremental redundancy principle. The more efficient approach for incremental redundancy disclosed herein is different from traditional approaches based on channel coding. A long precoder (following the guidelines discussed earlier) with a properly designed puncturing pattern is used. Upon receiving a negative acknowledgement (NACK), another segment from the precoder output matrix is sent, and the receiver attempts to decode using all the received observations up to this point. The design of an incremental redundancy precoder can be adapted based on the available processing power at the decoder of the receiver.

Disclosed herein is a unified approach for MIMO precoding. The strategy for implementation is modular and allows for simultaneously exploiting: 1) the full rate and full diversity features of the MIMO channel; 2) the beam-forming gain associated with the limited feedback channel state information (CSI); 3) the scheduling gain of the DL MIMO broadcast channel; 4) the adaptive power and rate control gain; and 5) the diversity gain resulting from the appropriate use of ARQ retransmissions. The preceding framework is parameterized and allows for a graceful three dimensional tradeoff between performance, complexity, and feedback channel capacity.

Figure 4:
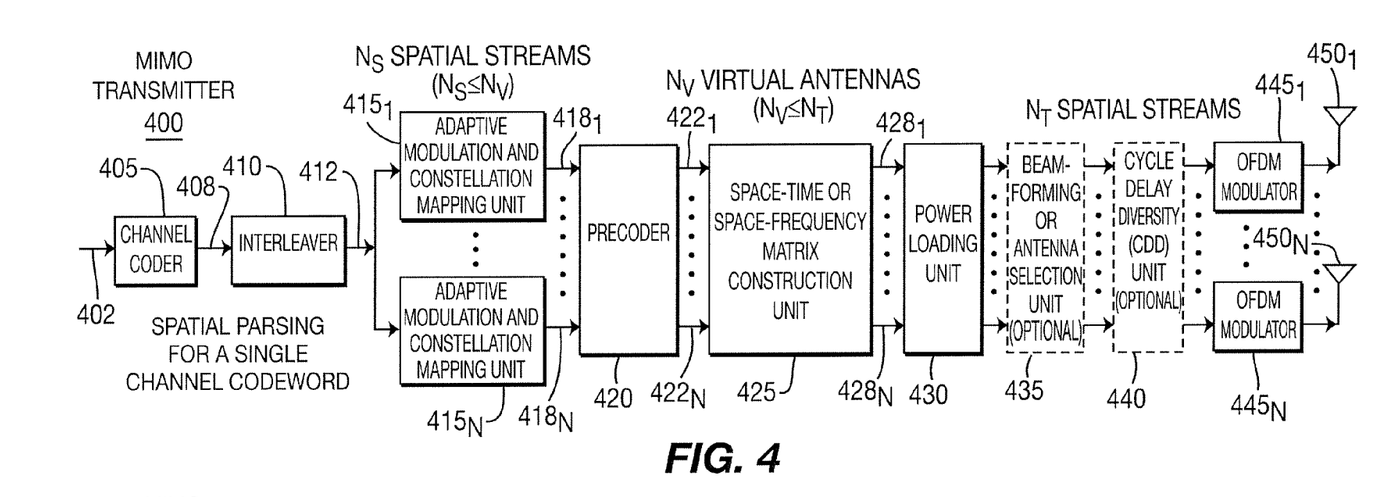
FIG. 4 is a block diagram of a MIMO transmitter.

FIG. 4 is a block diagram of a MIMO transmitter 400 that includes a channel coder 405, an interleaver 410, a plurality of adaptive modulation and constellation mapping units $415_1$-$415_N$, a precoder 420, an STF matrix construction unit 425, a power loading unit 430, an optional beam forming or antenna selection unit 435, an optional cyclic delay diversity (CCD) unit 440, a plurality of OFDM modulators $445_1$-$445_N$, and a plurality of antennas $450_1$-$450_N$.

The transmitter 400 shown in FIG. 4 operates using a single channel codeword. Information bits 402 for a single channel codeword are input to the channel encoder 405. Therefore, there is only one channel encoder 405 that applies to all the spatial streams. The channel encoder 405 may be, for example (but not limited to), a Turbo encoder, a low density parity check (LDCP) encoder, a convolutional encoder, a Reed-Solomon (RS) encoder, and the like. Data bits 408 constructed by the channel encoder 405 are input to the interleaver 410, which shuffles the data bits over time, (over different transmission timing intervals (TTIs)), over frequency, (i.e., over different subcarriers of an OFDM system), or over space, (i.e., over different spatial streams or different transmit antennas). The interleaver 410 determines which data bits are to be transmitted over which time-frequency-space resource units. This distribution of data bits depends on which scheme is to be used. The interleaver 410 should be designed based on the space-time matrix or space-frequency matrix being used in the space-time or space-frequency construction unit 425. Both the interleaver 410 and the STF matrix construction unit 425 determine the diversity gain from time-frequency-space resource units.

Still referring to FIG. 4, the interleaver 412 outputs Ns spatial streams 412. Each spatial stream 412 can have a different modulation. Therefore, each of the spatial streams 412 may have a different rate. This provides flexibility for diversity multiplexing trade off. The spatial streams 412 are processed by the adaptive modulation and constellation mapping units $415_1$-$415_N$, which map the Ns spatial streams 412 to transmit symbols $418_1$-$418_N$. For adaptive modulation to work effectively, some kind of feedback information from the receiver is needed. This may be achieved in the form of channel quality indicator (CQI) feedback from the receiver to the transmitter on a per received spatial stream basis. For a spatial stream that will go through higher received signal-to-noise ratio ($SN_R$), higher order modulation can be assigned. The order of modulation determines how many of data bits are grouped together to form a complex transmit symbol.

The precoder 420 and the STF matrix construction unit 425 work in tandem to jointly optimize the spatial multiplexing order and diversity gain. The spatial multiplexing order is increased if the reported CQI for streams are high. However, it may be desirable to increase the diversity order if the reported CQI is not satisfactory. In this general scheme, the number of spatial streams ($N_S$) can be different than the number of virtual antennas used ($Nv_V$) in the STF matrix. This provides flexibility for achieving independent diversity and multiplexing orders. The multiplexing order is given by Ns.

The transmitter 400 of FIG. 4 is very flexible by enabling the use of various popular schemes within the same architecture, as previously shown through Examples 1 through 4. The TAST scheme used is a full diversity full rate (FDFR) STF coder that includes the precoder 420, based on a Vandermonde matrix followed by either a space-time or space-frequency matrix, as provided by the STF matrix construction unit 425. The diversity order of the scheme is based on the number of resolvable independent Rayleigh multipaths, M. Therefore, the maximum diversity order that is achieved through TAST is $N_T \times N_R \times M$. Once the multiplexing order (Ns) and M is determined, TAST coding can be achieved. First, the baseband frequency band is divided into M subbands. Subbands are constructed by grouping consecutive subcarriers together. Then, transmit symbols are spread over different subbands to increase diversity.

Once the STF matrix $428_1$-$428_N$ is constructed, power loading is performed by the power loading unit 430 for each virtual antenna. However, there are two fundamental choices here. If a slow feedback channel (more common) exists, where CQI information is not up to date, a water filling approach is implemented using the adaptive modulation and constellation mapping units $415_1$-$415_N$. Thus, higher order modulation is provided to virtual antennas that have better received SNR than others. Alternatively, more power can be provided to virtual antennas with higher effective SNR. If the number of virtual antennas ($N_V$) is equal to the number of transmit antennas ($N_T$), the beamforming or antenna selection unit 435 is not required. Thus, the beamforming or antenna selection unit 435 is only required when $N_V < N_T$. When $N_T < N_V$, there are two choices that work with the TAST scheme.

In one embodiment, transmit antenna selection or beamforming may be performed using an optional beamforming or antenna selection unit 435. Transmit antenna selection may be performed in a cyclic pattern when no feedback is provided by the receiver, or it can be based on CQI feedback per antenna from the receiver. In the latter case, the antennas with the best received SNR are chosen. In either case, antenna selection requires less feedback than beamforming. If more channel feedback information is available through CQI, beamforming may be provided.

In another embodiment, the optional CCD unit 440 may be used. This scheme can provide some extra diversity gains in the case of a flat fading channel. The scheme described above can work with CDD seamlessly.

The OFDM modulators 445$_1$-445$_N$ performs an inverse fast Fourier transform (IFFT) of size K on the output of the transmitter 400 before being transmitted by the antennas 450$_1$-450$_N$.

Figure 5:
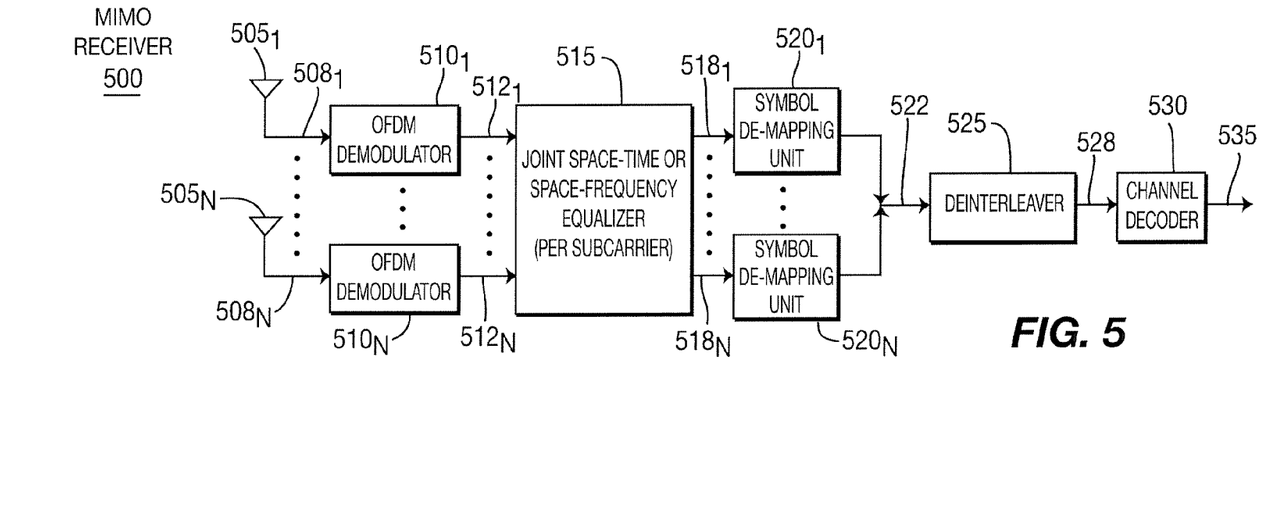
FIG. 5 is a block diagram of a MIMO receiver.

FIG. 5 is a block diagram of a MIMO receiver 500 that includes a plurality of antennas 505$_1$-505$_N$, a plurality of OFDM demodulators 510$_1$-510$_N$, a joint STF equalizer 515, a plurality of symbol de-mapping units 520$_1$-520$_N$, a deinterleaver 525 and a channel decoder 530.

The OFDM demodulators 510 perform a fast Fourier transform (FFT) operation of size K for each receiver antenna 505$_1$-505$_N$. The outputs 512$_1$-512$_N$ of the OFDM demodulators are processed by the joint STF equalizer 515. The joint STF equalizer 515 outputs received symbols 518$_1$-518$_N$, which are mapped back to received data bits 522 via the symbol de-mapping units 520$_1$-520$_N$. Once that is accomplished, the de-interleaver 525 recovers the original time sequence of received and ordered data bits 528 transmitted by the transmitter 400. Received and ordered data bits 528 are decoded by the channel decoder 530 to obtain receive information bits 535.

Some advanced receivers, such as series interference cancellation (SIC) receivers, require feedback from the output of the channel decoder 530 to the joint STF equalizer 515. If such feedback is provided, the joint STF equalizer 515 would provide soft decision outputs. In such a case, hard decisions are obtained through several iterations.

System Model

A MIMO-OFDM Rayleigh channel is considered with $N_T$ transmit antennas and $N_R$ receive antennas. For simplicity of presentation, the MIMO-OFDM channel is assumed to be flat and varies in frequency according to a block-fading model. In this model, one frame (i.e., one precoder code word) contains M blocks where the fading coefficients remain fixed across one block and changes independently from one block to the next. Therefore, the channel is modeled by an $N_T \times N_R \times M$ independent complex Gaussian random variables, (with zero mean and unit variance), where M is equal to the average number of resolvable independent Rayleigh fading multipaths. The additive noise in this model is assumed to be zero-mean with a white Gaussian distribution and every fading block is assumed to span min($N_T,N_R$) symbol intervals, (this last assumption is only intended for convenience of presentation and can be easily relaxed). Mathematically, the received signal is given by:

$$y_t = \sqrt{\frac{\rho}{N_t}} H_t x_t + w_t, t = 1, \ldots, T; \quad \text{Equation (47)}$$

where $\{x_t \in C_t^N : t=1, \ldots, T = \min(N_T, N_R) \times M\}$ is the transmitted signal, $\{y_t \in C_r^N : t=1, \ldots, T\}$ is the received signal, $\{w_t \in C_r^N : t=1, \ldots, T\}$ denotes the channel Gaussian noise with independent and identically distributed entries ~Nc(0,1), $\rho$ is the average signal-to-noise ratio (SNR) per receiver antenna, and $H_t$ is the $N_R \times N_T$ channel matrix with the $(i,j)$-th element $h_{ij}^c$ representing the fading coefficient between the j-th transmit and the i-th receive antenna at time t. The fading coefficients are further assumed to be independent and identically distributed ~Nc (0,1) and remain fixed for t=1, . . . , min($N_T$, $N_R$). A long term static automatic repeat request (ARQ) model with a maximum of L retransmission rounds, (i.e., L=1 corresponds to no-retransmissions), is used.

In this model, the channel coefficients remain constant during all ARQ rounds and change to new independent values with each new packet. This model aims at decoupling the ARQ gain from the temporal (or frequency) interleaving gain. It represents the worst case scenario in terms of the achievable diversity with a maximum of L ARQ rounds.

By enforcing the input constraint, (when power control is not allowed):

$$E\left[\frac{1}{T}\sum_{i=1}^{T}|x_t|^2\right] \leq N_T. \quad \text{Equation (48)}$$

The coherent scenario is adopted where the channel matrix Ht is assumed to be perfectly known at the receiver (the details of the channel estimation mechanism are not discussed here).

Based on the available complexity and channel state information, any number of five basic modules can be used jointly. The natural matching between the different modules is highlighted in the sequel.

Full Diversity Full Rate Precoding

It is well known that an ($N_T$, $N_R$, M) MIMO-OFDM channel can support a maximum multiplexing gain of min($N_R$, $N_T$) and can offer a maximum diversity advantage of $N_T N_R M$. Here, MIMO precoders that allow for simultaneously achieving the maximum diversity and multiplexing gains are FDFR precoders. Here, the TAST coding principle is used to construct FDFR precoders tailored to fit within our unified framework. The TAST framework is chosen due to its generality, ability to exploit spatial and frequency diversity, amenability to low complexity decoding, and parameterized nature.

It is assumed that there are no ARQ retransmissions, (i.e., L=1). The TAST precoder operates on an input vector of $(\min(N_R, N_T))^2$ M QAM symbols and produces a min($N_R$, $N_R$)×min($N_R$, $N_T$)M matrix to be transmitted across an equivalent MIMO channel with min($N_R$, $N_T$) transmit antennas. This equivalent MIMO channel is created by a beamforming precoder. The TAST precoder achieves the full rate property since the transmission rate is min($N_T$, $N_R$) QAM symbols per channel use. To achieve full diversity, the TAST precoder partitions the input vector into min($N_T$, $N_T$) vectors, each with an min($N_T$, $N_R$)M QAM symbols. Each vector is independently encoded by a full diversity single input single output (SISO) precoder (i.e., algebraic rotation matrix) and assigned to a different thread in the space-time transmission matrix. Each thread is chosen such that it spans all the min $(N_T, N_R)$ spatial dimensions and the M frequency dimensions. In order to minimize the mutual interference between the different threads, each one is multiplied by a different diophantine scaling factor. If $N_T > N_R$, then the beam-forming module discussed in the next section is inactive and the equivalent MIMO channel is the same as the original one. In this case, one can establish the full diversity property of the proposed TAST precoder.

Precoding for Generalized Beam-forming

The second module of the precoder exploits limited feedback, from the receiver to the transmitter, to realize a significant beam-forming gain when the number of transmit antennas is larger than the number of receive antennas (i.e., $N_T > N_R$). This module operates on the output matrix of our full rate full diversity TAST precoder. First, the singular value decomposition of $H_t$ is used to rewrite the received signal as:

$$y_t = \sqrt{\frac{\rho}{N_T}} U_t \Lambda_t V_t^H x_t + w_t; \quad \text{Equation (49)}$$

where $U_t$ is an $N_R \times N_R$ unitary matrix, $V_t$ is an $N_T \times N_T$ unitary matrix, and $\Lambda_t$ is an $N_R \times N_T$ diagonal matrix containing the min $(N_R, N_T)$ ordered eigenvalues of $H_t$, (i.e., $\lambda_1 > \ldots > \lambda_{min(N,M)}$). Note that the last $N_T - N_R$ columns of the matrix $\Lambda$ are all zeros. Then, the feedback information is used to construct an estimate of the matrix $V_t$ at the transmitter (i.e., $\hat{V}_t$). Then, $\hat{V}_t$ is used as precoder (i.e., multiplier) for an $N_T \times 1$ input column vector obtained as follows: every $N_R \times 1$ output vector where $N_R < N_T$ from our TAST precoder is multiplied by $\sqrt{(N_T/N_R)}$ and padded with $N_T - N_R$ zeros. In the following, the input vector to the beam-forming precoder is referred to as $\tilde{x}_t$ (where $x_t = \hat{V}_t \tilde{x}_t$). At the receiver, y is multiplied with $U_t^H$. This multiplication does not change the noise distribution, (i.e., $n_t = U^H w_t$ has the same distribution as $w_t$).

The idealistic scenario, where $\hat{V}_t = V_t$ is considered, is provided as an illustration. The receiver signal, after processing, is now given by $$\tilde{y}_t = \sqrt{\frac{\rho}{N_T}} \Lambda \tilde{x}_t + n_t. \quad \text{Equation (50)}$$

The beam-forming gain can be seen now in the fact that, through preceding with $V_t$, the MIMO channel has been changed into a set of $N_r$ parallel channels since the last $N_T - N_R$ columns of $\Lambda$ are all zeros. The average transmit power, i.e., $\rho$, is now divided among the first $N_R$ entries in $\tilde{x}_t$. Therefore, this preceding module allows for a beam-forming gain of 10 $\log_{10}(N_T/N_R)$ dB, (this corresponds precisely to the scaling factor multiplying the TAST precoder output before the beam-forming precoder).

The advantage of the TAST precoder can now be viewed by comparing it with the case where $\tilde{x}_t$ is the output of a V-BLAST spatial multiplexer. With the V-BLAST scheme, the probability of error will be determined by the stream assigned to the weakest eigenvalue whereas the TAST precoder allows every stream to experience all the eigenvalues with equal probability, and hence, avoids being limited by the weakest one. In practice, one would also expect a mismatch between $V_t$ and $\hat{V}_t$ due to the finite rate and/or errors and/or delay of the feedback channel. The full diversity property of the TAST precoder allows for an enhanced robustness to this mismatch.

Several design alternatives for constructing the beam-forming code-book, based on the available throughput of the feedback channel and the dimensionality of the system, have been proposed in literature. For systems with a relatively small $N_T$, $N_R$, and M, one can employ the straightforward approach of quantizing every fading coefficient independently with only a marginal loss in performance.

Scheduling Gain

The third advantage of the precoding framework disclosed herein is its ability to exploit the broadcast gain of the MIMO DL. When $N_T > N_R$, transmission to $\lfloor N_T/N_R \rfloor$ users can be scheduled simultaneously, and hence, the throughput of the DL is multiplied by a factor of $\lfloor N_T/N_R \rfloor$. The preceding framework allows for scheduling the users based on the partial feedback provided by them. Ideally, the users scheduled in the same time slot should use orthogonal precoders such that they do not suffer from mutual interference at the receiver(s). Here, the cross correlation between the different precoders is used as a scheduling metric. More specifically, the set of users $$\{i_1, \ldots, i_{\lfloor N_T/N_R \rfloor}\}$$

is chosen that minimizes:

$$\sum_{k=1}^{\lfloor N_t/N_r \rfloor} \sum_{j=1}^{\lfloor N_t/N_r \rfloor} \|V_t^{(i_k)H} V_t^{(i_j)}\|_2, \quad \text{Equation (51)}$$

where $V_t^{(i_k)}$ is the preceding matrix for user $i_k$ at time t, and $\|A\|$ is the Frobenious norm of the matrix A. This scheduling rule attempts to minimize the sum of the mutual interference between the different users scheduled in the same symbol interval.

The approach described herein permits scheduling different users in the different frequency bins (or symbol intervals). But, in order to support this feature, the parameters of the TAST precoder should be chosen such that one information stream is not spread across several independent blocks, (in the frequency domain), i.e., setting M=1 while designing the TAST precoder. Accordingly, an interesting tradeoff between scheduling gain and frequency diversity arises and the choice of the optimal parameters should depend on the system operation conditions, (e.g., delay spread, accuracy of the feedback information). It is also worth noting that alternative metrics can offer more significant performance gains in certain scenarios, (e.g., replacing $\Sigma$ with max or replacing the Frobenious norm with another norm). The choice of the proper scheduling metric should be based on a detailed simulation study under more realistic channel models.

Adaptive Power and Rate Control

If the feedback channel has enough capacity, the users can send back estimates of the channel eigenvalues, i.e., $\{\hat{\lambda}_1, \ldots \hat{\lambda}_{min}(N_r, N_t)\}$. This information can be used either to adapt the instantaneous rate, by varying the size of the QAM constellation, or to adapt the instantaneous power level, while keeping the long term average below $\rho$. The adaptation algorithm depends largely on the delay constraint imposed by the application. For delay sensitive applications that require a fixed transmission rate, the appropriate approach is to design the power control algorithm to effectively invert the channel, and hence, maintain the required transmission rate. The resulting performance gain is typically referred to as power control diversity. On the other hand, for delay tolerant applications, the adaptive power and rate control algorithm should attempt to achieve the exact opposite. More specifically, the adaptive algorithm should allocate more power, along with a higher transmission rate, to the favorable channel conditions. This approach is traditionally referred to as the water-filling strategy, and it is important to note that the rate adaptivity is critical here (whereas with delay sensitive data, rate control was not needed). Thus, this preceding approach allows for a seamless integration of the power and rate control features, if enough feedback capacity and transmitter/receiver complexity is available. In fact, one of the additional advantages of the full rate full diversity TAST precoders is that they minimize the required feedback information in this context. In particular, instead of feedback all the eigenvalues, the full diversity property of the precoders allows for adapting the power and rate levels based only on the instantaneous channel capacity.

ARQ Gain

The final ingredient in the precoding framework described herein is the incremental redundancy feature which is critical for optimally exploiting ARQ retransmissions. This provides the ability to transmit at a very high throughput with a relatively high error rate in the first round. The incremental redundancy supplied in the subsequent ARQ retransmission is relied upon to push the error rate down. The TAST precoder adapts to this incremental redundancy environment by encoding a longer input vector (i.e., $((min(N_R, N_T))^2 ML \times 1)$ into a $min(N_R,N_T) \times min(N_R, N_T)$ ML matrix where L is the maximum number of retransmissions (including the first round). The columns of the output matrix are appropriately partitioned into L sets of columns, (with a $min(N_T, N_R)$M columns in each set). In every round of transmission, initiated by the reception of a NACK signal, a different $min(N_R, N_T) \times min(N_R, N_T)$ M matrix is sent. After the l-th round, the decoder of the receiver attempts to decode the input vector by combining the l matrices received thus far. The efficiency of this approach hinges on the fact that the whole $((min(N_R, N_T))^2 ML \times 1)$ vector can be uniquely decoded from any of the L matrices separately using a low complexity decoder. It is apparent that the rate of this scheme can reach up to L times the rate with no-ARQ, based on the operating SNR. It is worth noting that the performance can be further improved by varying the power level based on the number of ARQ rounds.

The proposed incremental redundancy TAST precoder is compared with that of the incremental redundancy Alamouti constellation. There is no outer code and the performance of the precoder is focused on, assuming perfect error detection. The main advantage of the proposed scheme, compared with the Alamouti constellation, is the higher transmission rate in terms of the number of QAM symbols. This allows for using a constellation with a smaller size, assuming that the same asymptotic rate is targeted. In the following, a 2×2 MIMO channel with M=1 and L=2 is considered. Since $N_T=N_R$, the beam-forming (or scheduling) precoder modules are not employed, and hence, focus on the ARQ aspect of this approach.

Although the features and elements are described in the embodiments in particular combinations, each feature or element can be used alone without the other features and elements of the embodiments or in various combinations with or without other features and elements of the present invention. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A multiple-input multiple-output (MIMO) transmitter configured to operate in a plurality of modes, the MIMO transmitter comprising:
    $N_T$ transmit antennas for transmitting spatial streams;
    a precoder; and
    a space-time or space-frequency matrix construction unit in communication with the precoder and the transmit antennas, wherein the space-time or space-frequency matrix construction unit constructs a matrix that defines a threaded algebraic space-time (TAST) codeword based on a number of virtual antennas, $N_v$, and the number of transmit antennas, $N_T$, wherein the transmitter operates in an open loop mode when no feedback information is available, the transmitter operates in a semi-open loop mode when channel rank feedback information is available, and the transmitter operates in a closed loop mode when channel state information (CSI) is available.

2. The transmitter of claim 1 wherein the receiver is configured to provide feedback to the transmitter on a per received spatial stream basis.

3. The transmitter of claim 1 wherein the precoder is a full diversity full rate (FDFR) precoder.

4. The transmitter of claim 1 wherein the codeword comprises $N_s$ L modulated symbols, where $N_s$ is the number of spatial streams and L is the length of each symbol.

5. The transmitter of claim 4 wherein the codeword is divided into $N_s$ component vectors of length L, and each component vector is precoded such that it can be spread over at least one of space, joint space-time and joint space-frequency.

6. The transmitter of claim 1 wherein if $N_v < N_T$, either antenna selection or beamforming is applied to an output of the space-time or space-frequency matrix construction unit to achieve additional gain.

7. The transmitter of claim 1 further comprising:
a cyclic delay diversity (CCD) unit that is applied to at least one output of the space-time or space-frequency matrix construction unit to provide diversity gain in the case of a flat fading channel.

8. The transmitter of claim 1 wherein if $N_T > N_R$ and channel state information (CSI) is available, either antenna selection or beamforming is applied to at least one output of the space-time or space-frequency matrix construction unit to achieve additional gain.

9. The transmitter of claim 1 where the number of virtual antennas, $N_v$, the number of transmit antennas, $N_T$, and the number of spatial streams, $N_s$, can be set to values independently as long as $N_s < N_v < N_T$.

10. The MIMO transmitter of claim 1, wherein when the transmitter operates in the open loop mode a spatial multiplexing order is selected as $N_s = \min(N_T, N_R)$.

11. The MIMO transmitter of claim 1, wherein when the transmitter operates in the semi-open loop mode, $N_s = \text{rank}(H)$, where H is a MIMO channel matrix of size $N_R \times N_T$.

12. The MIMO transmitter of claim 1, wherein when the transmitter operates in the closed loop mode, $N_s = N_v = \text{rank}(H)$, where H is a MIMO channel matrix of size $N_R \times N_T$.

13. A multiple-input multiple-output (MIMO) transmitter comprising:
$N_T$ transmit antennas for transmitting $N_s$ spatial streams to a receiver having $N_R$ receive antennas;
a precoder; and
a space-time or space-frequency matrix construction unit in communication with the precoder and the transmit antennas, wherein the space-time or space-frequency matrix construction unit constructs a matrix that defines a threaded algebraic space-time (TAST) codeword based on a number of virtual antennas, $N_v$, and the number of transmit antennas, $N_T$, wherein the codeword is divided into $N_s$ component vectors of length L, and each component vector is separately precoded by the precoder such that it can be spread over at least one of space, joint space-time and joint space-frequency.

14. The transmitter of claim 13 wherein the transmitter operates in a plurality of different modes including:
(i) an open loop mode when no feedback information from the receiver is available, and a spatial multiplexing order is selected as $N_s = \min(N_T, N_1)$;
(ii) a semi-open loop mode when channel rank information is available, and $N_s = \text{rank}(H)$, where H is a MIMO channel matrix of size $N_R \times N_T$; and
(iii) a closed loop mode when channel state information (CSI) is available, and $N_s = N_v = \text{rank}(H)$, where H is a MIMO channel matrix of size $N_R \times N_T$.

15. The transmitter of claim 13 wherein the receiver is configured to provide feedback to the transmitter on a per received spatial stream basis.

16. The transmitter of claim 13 wherein the codeword comprises $N_s$ L modulated symbols, where $N_s$ is the number of spatial streams and L is the length of each symbol.

17. The transmitter of claim 13 wherein if $N_v < N_T$, either antenna selection or beamforming is applied to an output of the space-time or space-frequency matrix construction unit to achieve additional gain.

18. The transmitter of claim 13 further comprising:
a cyclic delay diversity (CCD) unit that is applied to at least one output of the space-time or space-frequency matrix construction unit to provide diversity gain in the case of a flat fading channel.

19. The transmitter of claim 13 wherein if $N_T > N_R$ and channel state information (CSI) is available, either antenna selection or beamforming is applied to at least one output of the space-time or space-frequency matrix construction unit to achieve additional gain.

20. A multiple-input multiple-output (MIMO) transmitter comprising:
$N_T$ transmit antennas for transmitting spatial streams to a receiver having $N_R$ receive antennas;
a precoder; and
a space-time or space-frequency matrix construction unit in communication with the precoder and the transmit antennas, wherein the space-time or space-frequency matrix construction unit constructs a matrix that defines a threaded algebraic space-time (TAST) codeword based on a number of virtual antennas, $N_v$, and the number of transmit antennas, $N_T$, wherein when $N_T > N_R$, transmission from the MIMO transmitter to $\lfloor N_T / N_R \rfloor$ users is scheduled simultaneously based on partial feedback provided by the users.

21. A multiple-input multiple-output (MIMO) transmitter comprising:
$N_T$ transmit antennas for transmitting spatial streams to a receiver having $N_R$ receive antennas;
a threaded algebraic space-time (TAST) precoder; and
a space-time or space-frequency matrix construction unit in communication with the precoder and the transmit antennas, wherein the space-time or space-frequency matrix construction unit constructs a matrix that defines a threaded algebraic space-time (TAST) codeword based on a number of virtual antennas, $N_v$, and the number of transmit antennas, $N_T$, wherein the TAST precoder adapts to incremental redundancy environments by encoding a longer input vector into a $\min(N_R, N_T) \times \min(N_R, N_T)$ML matrix where L is the maximum number of automatic repeat request (ARQ) retransmissions and M is the average number of resolvable independent Rayleigh fading multipaths.

22. A method of supporting downlink communication of single channel codewords in a wireless communication including a transmitter and a receiver, the transmitter including $N_T$ transmit antennas for transmitting $N_s$ spatial streams to a receiver having $N_R$ receive antennas, method comprising:
constructing a matrix that defines a threaded algebraic space-time (TAST) codeword based on a number of virtual antennas, $N_v$, and the number of transmit antennas, $N_T$;
dividing the codeword into $N_s$ component vectors of length L; and
precoding each component vector separately such that it can be spread over at least one of space, joint space-time and joint space-frequency.

23. The method of claim 22 further comprising;
the transmitter selectively operating in a plurality of different modes including:
(i) an open loop mode when no feedback information from the receiver is available, and a spatial multiplexing order is selected as $N_s = \min(N_T, N_R)$;
(ii) a semi-open loop mode when channel rank information is available, and $N_s = \text{rank}(H)$, where H is a MIMO channel matrix of size $N_R \times N_T$; and
(iii) a closed loop mode when channel state information (CSI) is available, and $N_s = N_v = \text{rank}(H)$, where H is a MIMO channel matrix of size $N_R \times N_T$.

24. The method of claim 22 further comprising:
the receiver providing feedback to the transmitter on a per received spatial stream basis.

* * * * *